(12) United States Patent
Henein et al.

(10) Patent No.: US 6,314,865 B1
(45) Date of Patent: Nov. 13, 2001

(54) VACUUM BRAKE BOOSTER

(75) Inventors: Nabil Henein, Darmstadt; Jürgen Faller, Kahl; Roman Teutsch, Neustadt, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/622,004

(22) PCT Filed: Feb. 12, 1999

(86) PCT No.: PCT/EP99/00904

§ 371 Date: Nov. 6, 2000

§ 102(e) Date: Nov. 6, 2000

(87) PCT Pub. No.: WO99/41122

PCT Pub. Date: Aug. 19, 1999

(30) Foreign Application Priority Data

Feb. 13, 1998 (DE) ............................................. 198 05 845

(51) Int. Cl.$^7$ ................................................... F01B 11/02
(52) U.S. Cl. ............................................................. 92/196.3
(58) Field of Search ............................. 92/165 PR, 169.3

(56) References Cited

U.S. PATENT DOCUMENTS

| | | | |
|---|---|---|---|
| 5,072,996 | * 12/1991 | Heibel et al. | 92/169.3 X |
| 5,090,298 | 2/1992 | Gautier et al. | 92/165 PR X |
| 5,410,880 | * 5/1995 | Schluter | 92/169.3 X |
| 5,447,030 | * 9/1995 | Wang et al. | 92/169.3 X |
| 5,487,327 | * 1/1996 | Schluter et al. | 92/165 PR X |
| 6,189,437 | * 2/2001 | Morlan | 92/169.3 X |

FOREIGN PATENT DOCUMENTS

| | | |
|---|---|---|
| 29 18 909 | 11/1980 | (DE) . |
| 43 32 611 | 1/1995 | (DE) . |
| 195 24 492 | 1/1997 | (DE) . |
| 2 540 810 | 8/1984 | (FR) . |
| 2 075 624 | 11/1981 | (GB) . |
| 93 14964 | 8/1993 | (WO) . |

* cited by examiner

Primary Examiner—John E. Ryznic
(74) Attorney, Agent, or Firm—Rader, Fishman & Grauer PLLC

(57) ABSTRACT

A vacuum brake force booster for a vehicle brake system, in particular, with a master brake cylinder that can be attached along with the brake force booster to a wall of an automotive vehicle, with a housing comprised of at least two wall elements attached to each other, and with at least one reinforcing element that extends through the interior of the housing and has a thin-walled tubular shape. The essence of the present invention is that the reinforcing element on at least one end passes over into a radially extending fastening portion which extends, at least in a partial zone, in parallel to the associated wall element and is supported on the wall element so that the interior of the brake force booster is separated pressure-tightly from the atmosphere. The present invention permits a simple and low-cost assembly of the brake force booster without the necessity of additional sealing elements which are difficult to mount.

12 Claims, 3 Drawing Sheets

VACUUM BRAKE BOOSTER

TECHNICAL FIELD

The present invention generally relates to brake systems and more particularly relates to a vacuum brake force booster for a vehicle brake system.

BACKGROUND OF THE INVENTION

A vacuum brake force booster of this type is generally disclosed in EP 119 880 A1. Principally, it must be taken into consideration that the interior of a vacuum brake force booster houses two pneumatic chambers which are separated from each other by a movable wall and are evacuated in the non-actuated condition of the brake system. Beside mechanical stresses of most different types, the housing must transmit pressure forces due to the differential pressure between the residual pressure in the interior of the brake force booster and the external atmospheric pressure so that there is an imperative need for defined minimum wall thicknesses of the housing which is made up of two wall elements fastened to one another. In terms of weight reduction of all components installed in an automotive vehicle, there is the increasing trend of employing, as a material, materials with a low specific weight, such as aluminum or plastics, or of using steels of higher rates of strength. In addition, a permanent objective is to minimize the wall thickness of component parts. Therefore, it has been known in the art, see e.g. the above-mentioned patent application, to provide reinforcing elements which extend through the interior of a brake force booster housing and have a thin-walled tubular shape. On the one hand, this means ensures that the two wall elements remain at a defined distance from each other even with a small wall thickness and with high pressure forces, so that the housing of the brake force booster will not yield. On the other hand, a tubular reinforcing element permits passing a fixing anchor through the interior of the brake force booster and attaching the brake force booster along with a master brake cylinder to a wall of an automotive vehicle.

An arrangement of this type suffers from the disadvantage that the slots and gaps which are produced by the use of the tubular reinforcing element must be sealed pressure-tightly. This applies, on the one hand, to slots in the wall elements which extend from the interior of the brake force booster in an outward direction and, on the other hand, also to slots between the two pneumatic chambers.

In the above-mentioned patent application, the reinforcing element is arranged in a third chamber which is separated by the two pneumatic chambers by means of an additional sealing element. Such a measure produces a major cost increase in large-series production which is a significant disadvantage. Besides, the mentioned third chamber is quasi permanently subjected to atmospheric pressure so that its surface does not assist in the generation of the boosting force. This shortcoming is principally unacceptable in view of ever more reduced mounting spaces and the necessity of still more powerful automotive vehicle brake devices.

An object of the present invention is to provide an optimally sealed vacuum brake force booster which does not only permit low-cost manufacture in large quantities but also satisfies the demands with respect to structural volume, weight, strength and capacity. One objective of special emphasis is to configure the assembly made up of brake force booster and master brake cylinder so that it can be installed easily into an automotive vehicle.

This object is achieved by the present invention wherein the reinforcing element on at least one end passes over into a radially extending fastening portion which extends at least in a partial zone in parallel to the associated wall element and is supported on the wall element so that the interior of the brake force booster is separated pressure-tightly from the atmosphere.

Thus, according to the present invention, the reinforcing element independently ensures the necessary sealing without requiring a separate structural element or sealing element.

DETAILED DESCRIPTION OF THE PREFERRED EMBODIMENTS

Figure 1:
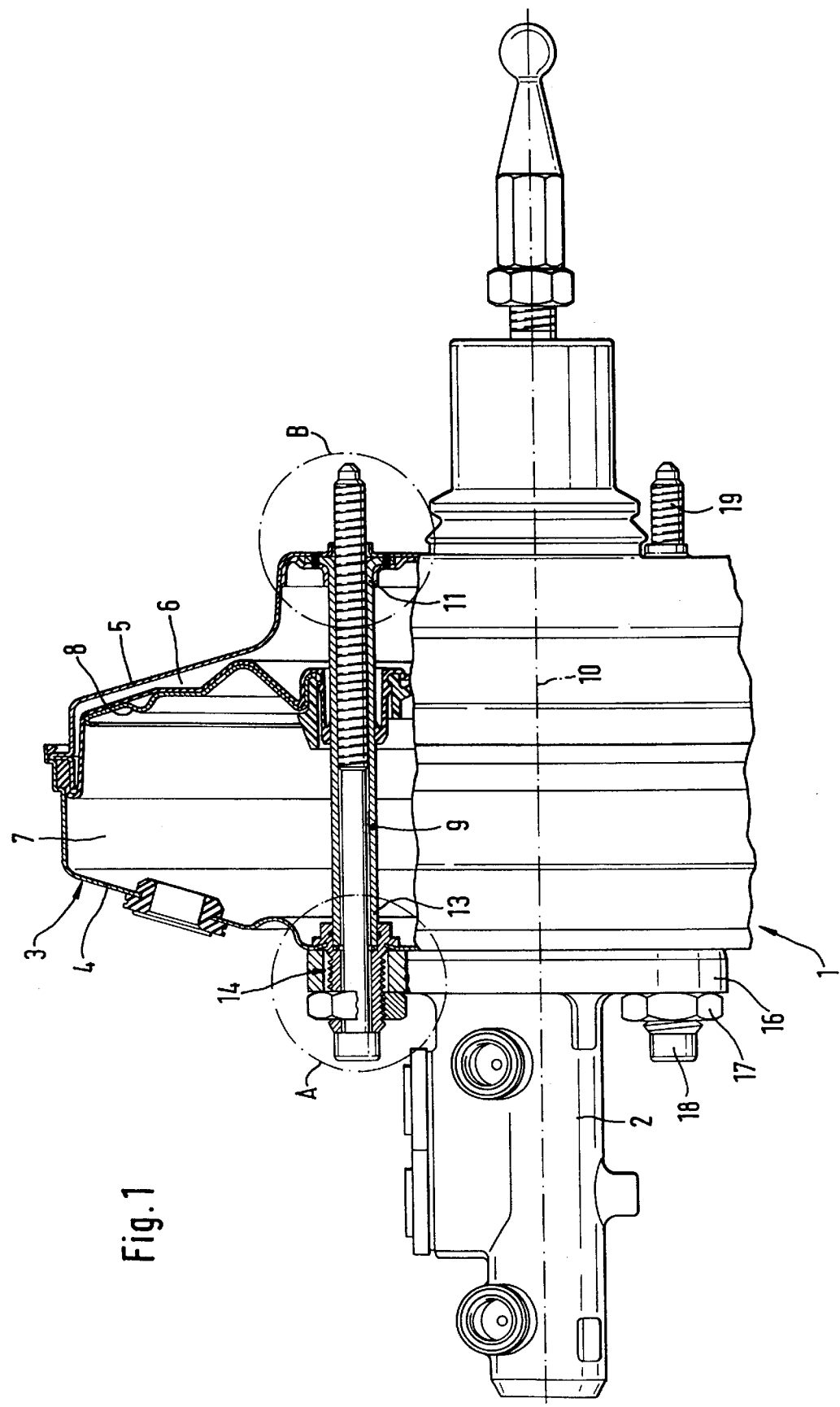
FIG. 1 is a partial cross-sectional side view of an assembly made up of a master brake cylinder and a brake force booster.

A master brake cylinder 2 for the actuation of a vehicle brake system is arranged on a lefthand end face of a vacuum brake force booster 1 according to FIG. 1. The assembly composed of a vacuum brake force booster and a master brake cylinder (the so-called brake device) is intended for attachment to a (non-illustrated) wall of an automotive vehicle, and the brake force booster has a housing 3 made up of at least two wall elements 4, 5 secured to one another. The interior of the housing 3 houses, among others, a first pneumatic chamber 6, i.e., a working chamber, and a second pneumatic chamber 7, i.e., a vacuum chamber. The two pneumatic chambers 6, 7 are separated from one another by a movable wall 8 and, in dependence on the respective actuating condition, pressure prevails in the first pneumatic chamber 6 which corresponds to the pressure in the second pneumatic chamber 7, to the atmospheric air pressure, or a pressure between these two extreme values. There is no need for a more detailed explanation of the exact functioning of the vacuum brake force booster 1 in this respect.

The interior of the brake force booster 1, this means also the two chambers 6, 7, is penetrated by a thin-walled tubular reinforcing element 9. Further, the reinforcing element 9 serves as a support of the two wall elements 4, 5 with respect to each other in the direction of the axis 10. At a first end 11, the reinforcing element 9 passes over into a radially extending fastening portion 12 which, as becomes obvious from FIG. 3, extends in a partial area in parallel to the wall element 5 associated with it and is supported on the wall element 5 in such a way that the interior of the brake force booster 1 is pressure-tightly isolated from the atmosphere.

Figure 2:
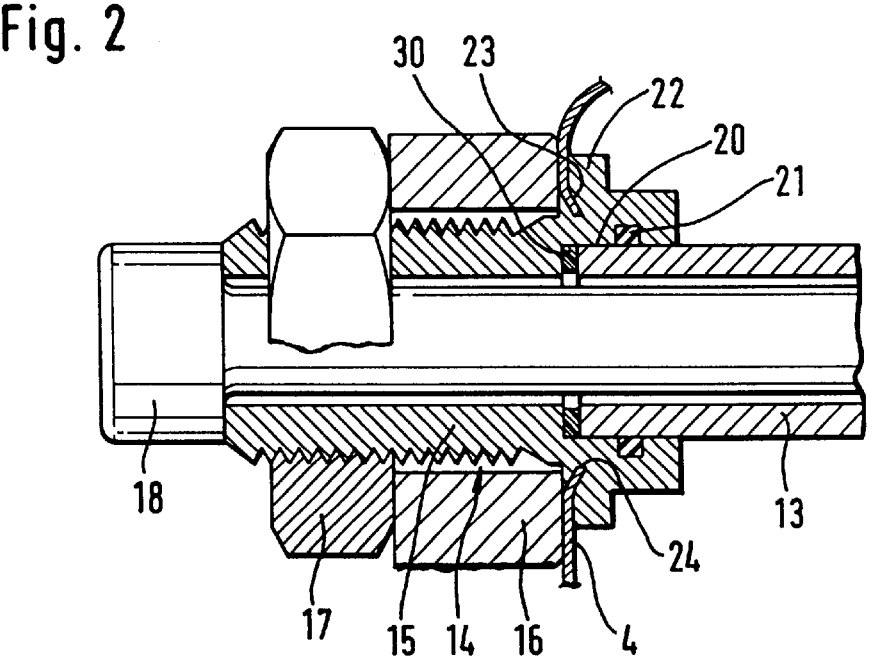
FIG. 2 is an enlarged view of a detail referred to by A in FIG. 1.

On a second end 13, the reinforcing element 9 engages into a fastening member 14 rigidly connected to the wall element 4, as can be seen in detail in FIG. 2. The fastening member 14 extends with a bushing 15 through a bore in the wall element 4 and a bore in a flange 16 of the master brake cylinder 2. The bushing 15 has an external thread and projects through the flange 16 so that the attachment between the wall element 4 and the master brake cylinder 2 can be effected by means of a nut 17. For fastening the assembly made up of vacuum brake force booster 1 and master brake cylinder 2 to the wall of an automotive vehicle (not shown) a threaded pin 18 is used which is slipped through the assembly made up of master brake cylinder 2 and brake force booster 1 in such a fashion that a screw coupling on the wall (not shown) can be performed by means of a threaded portion 19 on an end opposite to the head.

FIG. 2 shows a section A on an enlarged scale so that details of the present invention can be described with greater precision. The reinforcing element 9 which, moreover, has a precisely defined length engages with its second end 13 into a bore 20 of the hollow fastening member 14. To seal the reinforcing element 9, a sealing element, for example an O-ring 21, is arranged in a groove of the bore 20 and acts upon an outside periphery of the reinforcing element 9, thereby sealing the second pneumatic chamber 7 with respect to the environment.

Further, it can be taken clearly from FIG. 2 that the fastening member 14 has a collar 22 with in the second pneumatic chamber 7 and backgrips with it the bore in the wall element 4.

Also, the fastening member 14 is connected to the wall element 4 in a positive and operative engagement as well as in particular in a rotationally secured and vacuum-tight fashion because a rim 23 of the bore provided in the wall element 4 is embossed into a circumferential groove 24 of the fastening member 14 which extends in a transverse radial direction. Further, a bore step is arranged within the bore in the fastening member 14, on which bore step an end piece of the reinforcing element 9 abuts by the intermediary of a spacer 30. In a particularly favorable embodiment of the present invention, one single component combines the function of the force-transmitting distance washer and the function of the sealing element 21 so that the number of necessary components is reduced. This aim is principally achieved in that the spacer 30 is made of an elastically and/or plastically deformable material and, in the unmounted condition, has a small oversize at least in an axial direction (with respect to its thickness). When the brake force booster is mounted, with the reinforcing element 9 with its end piece exerting force on the spacer 30, the spacer undergoes adaption, the result of which is complete sealing. This consequently obviates the need for a separate sealing element 21 which abuts on the periphery of the reinforcing element 9. Or, element 21 may be optionally provided in addition for sophisticated applications, as the requirement may be.

Figure 3:
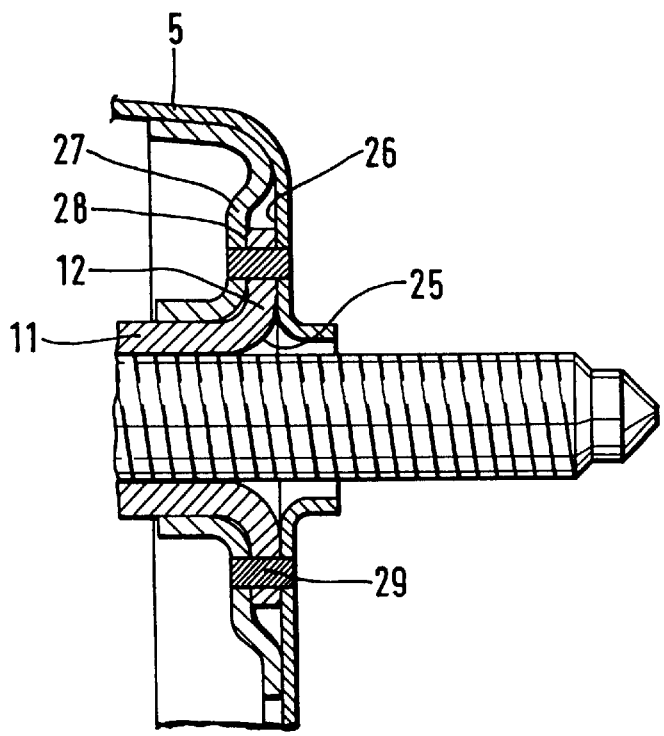
FIG. 3 is an enlarged view of a detail referred to by B in FIG. 1.

In detail, the first end 11 with the radially extending fastening portion 12 can be seen in FIG. 3. The fastening portion 12 extends quasi like a flange radially outwardly and is in parallel to the associated wall element 5, at least in a radially external partial area, it being supported on the wall element 5 so that the interior of the brake force booster, especially the first pneumatic chamber 6, is pressure-tightly isolated from the atmosphere. In this connection, the flange-shaped end provides a good force transmission in an axial direction, and it can be seen that the fastening portion 12 with its bottom side 25 abuts on an inner side 26 of the associated wall element 5. Besides, an additional supporting plate 27 bears against a top side 28 of the fastening portion 12. According to the preferred embodiment as shown in this Figure, the reinforcing element 9 is molecularly interfaced with the wall element 5 by means of an annularly circumferential welding seam 29. Manufacture and assembly are especially simplified when the reinforcing element 9 along with the supporting plate 27 is pressure-tightly connected and molecularly interfaced with the wall element 5.

It applies to all embodiments of the present invention that it is principally also possible for both ends of the reinforcing element 9, 42, 50 to have an identical construction, without departing from the spirit of the present invention. This standardization achieves an additional reduction in the necessary effort and structure and is preferred under cost aspects.

Figure 4:
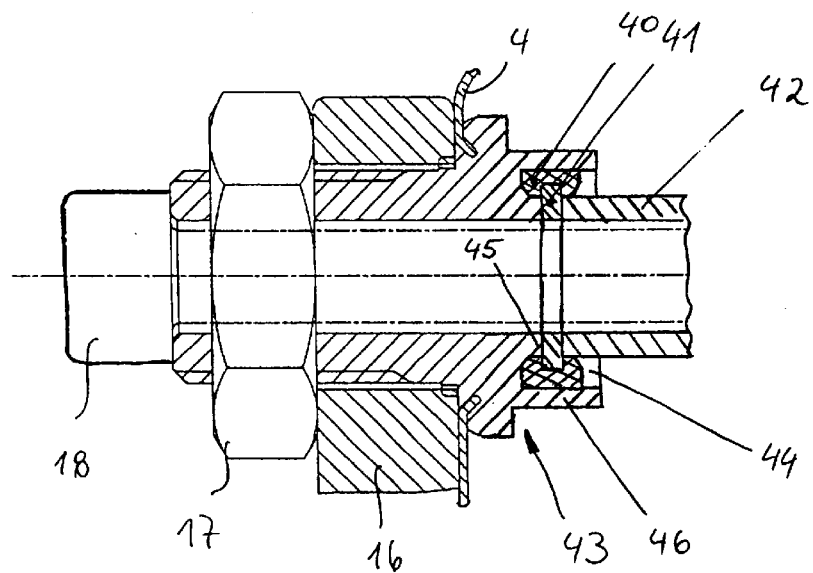
FIG. 4 is a variation depicted as in FIG. 2.

In another embodiment of the present invention (FIG. 4) which corresponds in some points to the embodiment according to FIG. 2, a sealing element 40 embraces an annular spacer 41 and sealingly abuts on the periphery of the reinforcing element 42 and on the fastening member 43. As can be seen in this Figure, the fastening member 43 has an annular slot 44 which is produced between a first socket 45, that extends from the body of the fastening member 43 axially into the housing interior, and a second socket 46 that projects in an axial direction. The annular slot 44 permits a very simple and, so-to-speak, self-centering pressing in of the sealing element 40, without the risk of damage. Both the sockets 45, 46 and the annular slot 44 extend concentrically to the reinforcing element 42, and the radially external socket 46 has a greater axial length than the radially internal socket 45 so that it overlaps the sealing element 40 in full and the reinforcing element 42 at least in part.

The sealing element 40 permits special ease of manipulation during the assembly when its elastic material is cast or injection-moulded integrally to the spacer 41 made of a rigid material so that the spacer 41 is additionally used as a carrier member. This provision reduces the risk of faulty positioning of the sealing element in addition and, besides, achieves the benefit of reducing the logistics. For example, when the sealing element 40 is preassembled with the spacer 41 in the annular slot 44, there is only need of slipping in the reinforcing element 42. It should be noted further that, with this assembly, the circumferential area of the reinforcing element 42 slipped into the bore may generally be left in the condition it is supplied, i.e., without finishing operations.

Figure 5:
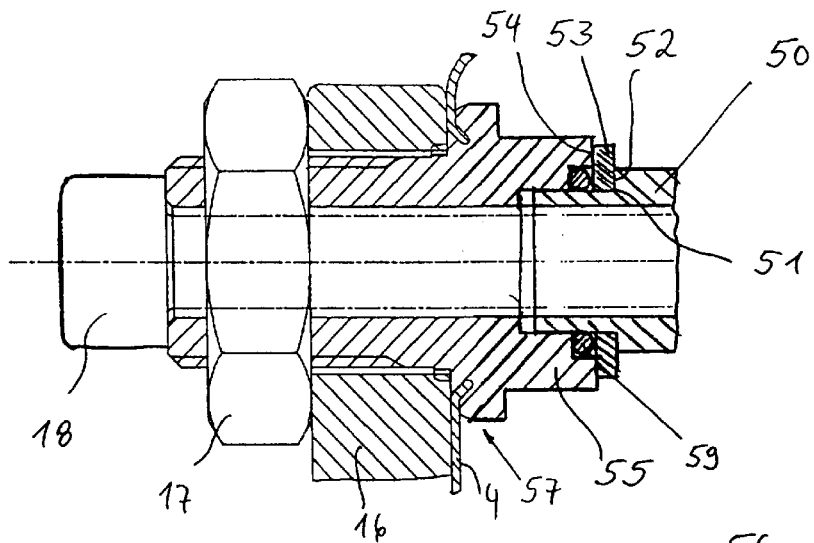
FIG. 5 is another variation depicted as in FIG. 2.
Figure 6:
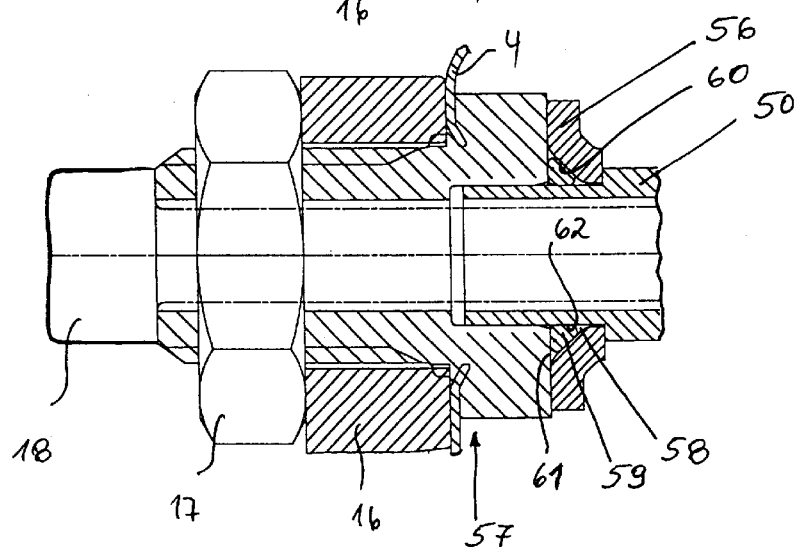
FIG. 6 is a variation of the embodiment according to FIG. 5.

In the embodiments according to FIGS. 5 and 6, reinforcing element 50 has a step 51 at its periphery, and reinforcing element 53 is supported on the radial abutment surface 52 of step 51. With its other side, spacer 53 is abutted on a front surface 54 of a socket 55 which overlaps the reinforcing element 50 at least in part. Consequently, pressure forces which are applied to the housing are transmitted to step 51 rather than via the front surface of the end 13 as is the case in the embodiments according to FIGS. 2 and 4. This permits very simply determining the distances between the abutment surface 52 and the front surface 54 so that the selection of fitting spacers with the necessary thickness is facilitated. With respect to the measuring operation and the selection and tolerances of the spacers 30, 41, 53, German patent application, serial No. DE 19 904 430.9, which is not prior published, is referred to and its disclosure is included in this respect.

It can be taken from FIG. 6 that the spacer 56 between reinforcing element 50 and fastening member 57 defines an annular chamber 58 in which the sealing element 59 is provided. An inclined surface 60 as in the drawing is advantageous because the sealing element 59 abuts on three surfaces in total, of which one sealing surface 61 on the end surface of a socket and one sealing surface at the periphery of the reinforcing element form a right angle. More specifically, in contrast to right-angled recesses or grooves, the risk of damage is reduced because due to the three-cornered annular chamber 58 no sharp edges or rims will get into contact with the sealing element 59. Instead, there are plane abutments exclusively, even during the assembly.

What is claimed is:

1. Vacuum brake force booster for a vehicle brake system, comprising:
   a housing having at least two wall elements attached to each other, and with at least one reinforcing element that extends through the interior of the housing and has a thin-walled tubular shape, wherein the reinforcing element includes an end which engages into a bore of a hollow fastening member by way of an intermediary sealing element.

2. Vacuum brake force booster as claimed in claim 1, wherein the sealing element abuts on the periphery of the reinforcing element.

3. Vacuum brake force booster as claimed in claim 1, wherein the sealing element annularly embraces a spacer and sealingly abuts on the periphery of the reinforcing element and on the hollow fastening member.

4. Vacuum brake force booster as claimed in claim 1, wherein the sealing element is arranged in an annular slot which is provided between a first socket that projects axially in the direction of the reinforcing element, and a second concentric socket.

5. Vacuum brake force booster as claimed in claim 4, wherein the second concentric socket entirely overlaps the first.

6. Vacuum brake force booster as claimed in claim 1, wherein the second concentric socket overlaps the sealing element and at least part of the reinforcing element.

7. Vacuum brake force booster as claimed in claim 1, wherein the sealing element is made of an elastic material and is cast or injection-moulded integrally with a spacer that is made of a rigid material.

8. Vacuum brake force booster as claimed in claim 1, wherein the bore in the reinforcing member has a step on which an end piece of the reinforcing element abuts, by the intermediary of a spacer.

9. Vacuum brake force booster as claimed in claim 8, wherein the spacer is made of an elastically or plastically deformable material and additionally acts as a sealing element.

10. Vacuum brake force booster as claimed in claim 1, wherein the reinforcing element includes a step at its periphery, and in that a spacer is provided which, on the side of the step, abuts on an abutment surface and, on the other side, abuts on a front surface of a socket that overlaps the reinforcing element at least in part.

11. Vacuum brake force booster as claimed in claim 10, wherein the spacer defines an annular chamber between the reinforcing element and the fastening member.

12. Vacuum brake force booster as claimed in claim 11, wherein the sealing element in the annular chamber is arranged so that a plane abutment on three sides is achieved.

* * * * *